United States Patent [19]

Truhan

[11] 4,151,811
[45] May 1, 1979

[54] HOUSING APPARATUS FOR ANIMALS

[76] Inventor: Andrew Truhan, P.O. Box 467, Granite Falls, N.C. 28630

[21] Appl. No.: 841,482

[22] Filed: Oct. 12, 1977

[51] Int. Cl.² .................................................. A01K 31/18
[52] U.S. Cl. ...................................... 119/21; 119/33
[58] Field of Search .................. 119/1, 21, 15, 16, 22, 119/82, 32, 33

[56] References Cited

U.S. PATENT DOCUMENTS

| | | | |
|---|---|---|---|
| 2,223,358 | 12/1940 | Olson et al. | 119/33 |
| 2,910,044 | 10/1959 | King et al. | 119/1 |
| 2,963,004 | 12/1960 | Pockman et al. | 119/51 R |
| 3,718,118 | 2/1973 | Bibler | 119/82 X |
| 3,805,743 | 4/1974 | Crowder | 119/82 |

Primary Examiner—Hugh R. Chamblee
Attorney, Agent, or Firm—Harold L. Stowell

[57] ABSTRACT

Small animals and particularly the galliformes such as chickens are raised in a housing having a plurality of intercommunicable rooms, each of the rooms comprising progressively larger areas and each of said rooms being provided with independently controlled, heating, ventilating, lighting and feeding means, and means for progressively moving the small animals sequentially through each such room at a rate such that the animals are at a predetermined maturity upon departure from the last of the rooms.

2 Claims, 3 Drawing Figures

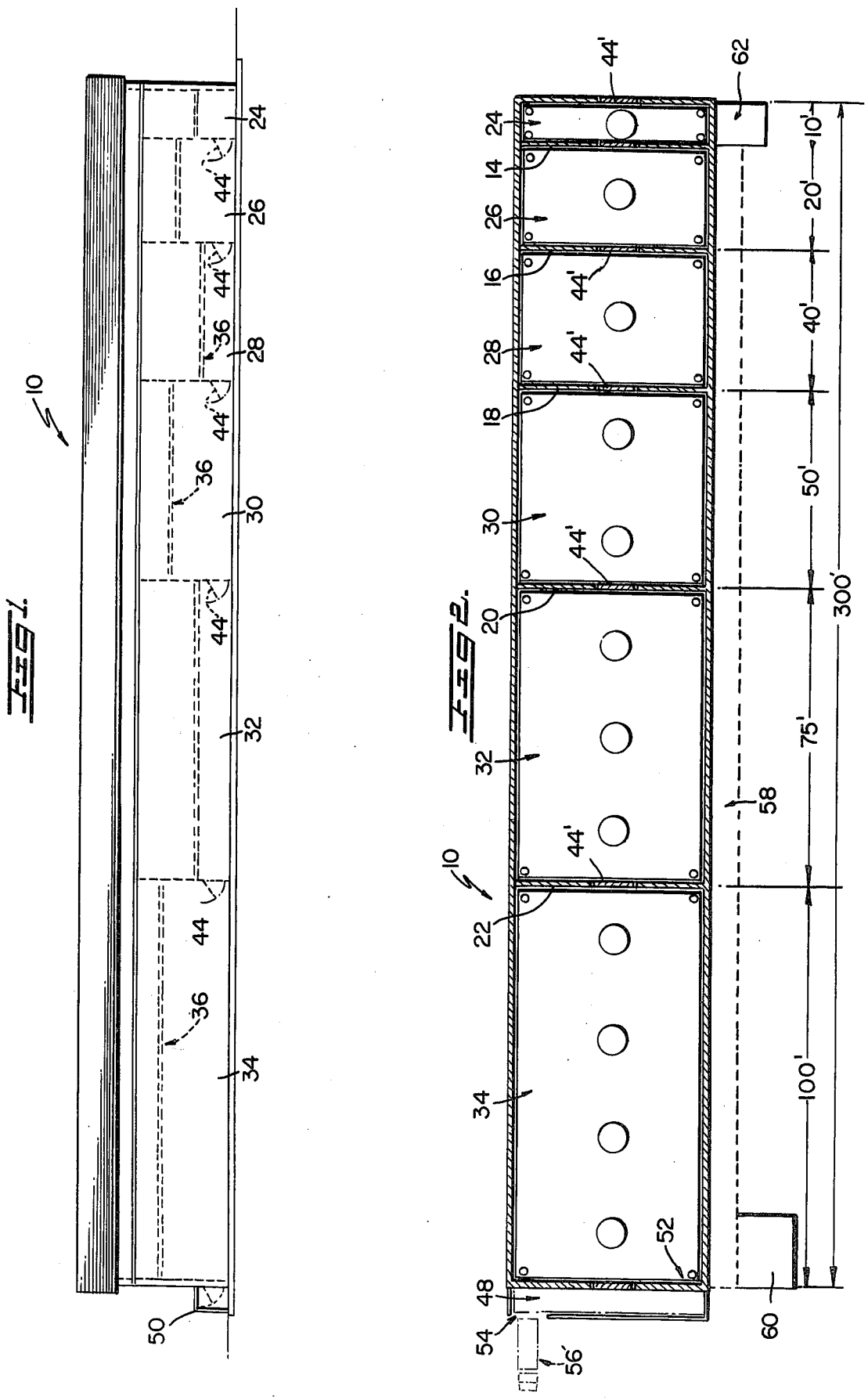

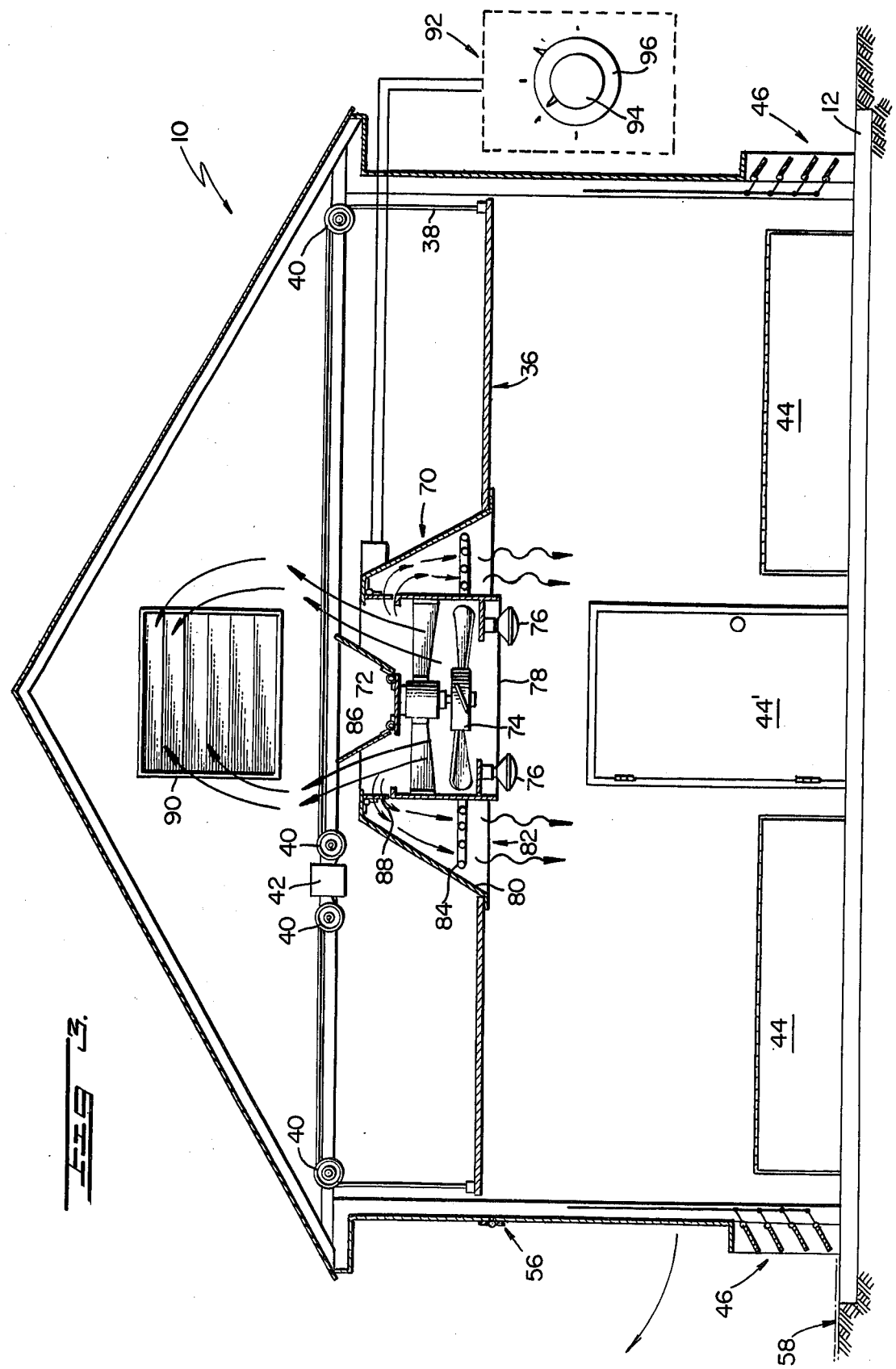

HOUSING APPARATUS FOR ANIMALS

BACKGROUND OF THE INVENTION

1. Field of the Invention

This invention is directed to a method of raising small animals and particularly the galliformes such as chickens whereby substantially larger numbers of birds can be raised in the space normally employed at a substantially less cost per matured bird and to apparatus for carrying out the method.

2. Description of the Prior Art

One frequently employed method of raising chickens is to place chicks in a house or enclosure comprising a single room and to remove the birds seven weeks later at which stage the birds are ready for market. In one chicken growing area of this country, the single housing would be, for example, 300 feet long and 40 feet wide, into which 16,000 chicks are placed and the survivors thereof are removed at the end of seven weeks. It will be appreciated that the entire housing must be heated to a relatively high temperature or maintained at a relatively high temperature when the birds are first placed in the housing and particularly during summertime substantial cooling must be provided for the house after the chicks have grown to substantial size birds. Further, it will be appreciated that it is only possible to clean the chicken house at the most every seven weeks and all of the remaining of the 16,000 chicks must be removed at the same time. Such conditions are unfavorable for maximum bird survival, wasteful of energy and space and the birds are subjected to conditions which are conducive to the development of breast blisters and sore eyes, and the conditions are such that they promote growth of flies and unhealthful odors.

SUMMARY OF THE INVENTION

The present invention provides method and apparatus whereby production of birds is substantially increased through better spaced utilization, a system which substantially eliminates breast blisters through reduction of ammonia present in the growth areas; reduces substantially the energy consumption in heating and cooling the housing area; improves waste and litter handling; reduces bird handling; provides for flexibility in feed and lighting control; improves litter cleanup and the like, all as to be more fully described hereinafter.

In general the system provides for raising small animals and particularly the galliformes such as chickens in a housing having a plurality of intercommunicable rooms, each of the rooms comprising progressively larger zones or areas and each of the zones are provided with independently controlled, heating, ventilating, lighting and feeding means and means are provided for progressively moving the small animals sequentially through each of the zones at a rate such that the animals are at a predetermined maturity upon departure from the last of the rooms or zones.

BRIEF DESCRIPTION OF THE DRAWING

The invention will be particularly described in reference to the accompanying drawing wherein:

FIG. 1 is an elevational view of a small animal raising structure embodying the principals of the present invention;

FIG. 2 is a sectional view of line 2—2 of FIG. 1; and

FIG. 3 is a vertical sectional view through one of the zones of the structures shown in FIGS. 1 and 2.

DESCRIPTION OF THE PREFERRED EMBODIMENTS

Referring to the drawings, 10 generally designates a housing for raising galliformes such as chickens. By way of illustration, the house has a length of about 300 feet and a width of about 40 feet, being a standard housing for raising 16,000 chicks to edible birds in a period of seven weeks. The illustrated house has a height of approximately 8 feet to the eave line and a pitched roof.

The house is placed on a concrete or the like pad 12 and interiorly the house is divided into six zones by partitions 14, 16, 18, 20 and 22 to provide zones 24, 26, 28, 30, 32 and 34. Further, in an illustrated example wherein the length of the building is 300 feet, these zones have dimensions of about 10 feet, 20 feet, 40 feet, 50 feet, 75 feet and 100 feet respectively.

As more clearly shown in FIGS. 1 and 3, each of the zones is provided with a movable ceiling generally designated 36. The movable ceilings are supported from suitable cables 38 trained about a system of pulleys 40 which in turn are connected to a power driven reel and wrench 42, whereby the height of the ceiling 36 above the floor or foundation 12 is fully adjustable and in FIG. 1 the ceilings 36 are shown at various heights. By providing the adjustable ceiling heights, a substantial savings in energy is provided for, for example, when the chicks are in zone 24 and are in their second week of maturation, the birds are very small and the ceiling may be lowered, whereas during their last or seventh week in the housing, that is in zone 34, the ceiling would be substantially higher to provide for a greater volume of air for the larger birds.

As illustrated in FIG. 1, each of the partitions 14, 16, 18, 20 and 22 is provided with one or more closable opening 44 and a door 44' to provide for communication between the successive rooms 22, 24, 26, etc. Further, each of the zones or rooms 24, 26, 28, etc. is provided with closable openings 46, FIG. 3, illustrated in FIG. 3 as movable louvers to provide for the inflow of ambient air into each space or the outflow of air from the space. The louvers are suitably controlled as is known in the art and each of the openings extends in the sidewalls a substantial portion of the length of each zone so that dependent upon the size of the zone a greater or less amount of openings is provided.

Further, as illustrated in FIGS. 1 and 2, the system also includes a conveyer 48, of the belt type, which extends substantially the width of the housing at the exit of zone or space 34. The conveyer 48 is maintained in a tunnel-like housing 50 which communicates with the interior of space 34 via closable outlet 52 and communicates with a loading dock or loading area generally designated 54, whereby when the birds have reached maturity, opening the door 52 permits the birds to enter the conveyer 48 substantially in single file to be conveyed to adjacent the loading area 54 where the birds are placed in shipping containers and loaded onto, for example, the truck illustrated at 56'.

The assembly also includes a further conveyer generally designated 58 which extends substantially the length of the housing along one side thereof which conveyer has its top surface substantially lever with the top of the flooring 12 whereby a small scoop or garden tractor may be used to push the chicken manure from the floor onto the conveyer and then conveyed to a storage bin generally 60 to store the manure until it can be sold or otherwise disposed with. To enable the entrance of the tractor and permit removable of the manure from the floor, the louvered section 46 on the conveyer side of the building is swingable hinged or otherwise releasably movable as at 56, FIG. 3 of the drawing, or the tractor may enter via doors 44'. The assembly further includes a small, external house generally designated 62 having a length substantially equal to the length of the space 24 and a width of, for example, 12 to 15 feet. The interior of this small house 62 communicates with the zone 24 via an openable partition in the sidewall of the housing between the primary house 10 and the secondary house 62. The small housing is adapted to maintain the newly received chicks during the first week of their maturation.

Referring again to FIG. 3, as is known in the art, it is necessary to provide ventilation, heating, cooling, and lighting for the birds being raised. A particularly advantageous system is illustrated in FIG. 3, wherein the heating, cooling, ventilating and lighting control means are mounted in each of the movable ceilings and generally designated 70. It will be noted from FIG. 2 that, where units such as units 70 are employed, one unit is mounted in the movable ceiling of each of the spaces 24, 26 and 28; two in zone 30; three in zone 32 and four in zone 34.

Turning again to FIG. 3, each of the units 70 includes a reversible motor 72 having its shaft connected to a fan 74. About the fan are a plurality of electric lights 76. About the central housing 78 is a further housing 80.

In the zone generally designated 82, between the inner and outer housing 78 and 80 is provided heat exchange elements designated 84. The heat exchange elements may be provided with heating or cooling fluids as required and the hearting and/or cooling may be provided by other heat exchange means from heat extracted from one portion or one zone and transferred to another zone having greater heat requirements or the heat may be provided by solar energy units and the like as well known in the art.

It will be noted that each of the units 70 is provided with a plurality of louvers or gates 86, 88, whereby the direction of flow of air into or out of the zone being controlled may be regulated. Further, it will be noted that in the housing ends are mounted further controllable louver elements generally designated 90 for the inlet or exit of air.

The plural means for controlling the lights, fan, direction of motor rotation, louvers 86 and 88, etc. are controlled via a dual element controller generally designated 92 having first and second control knobs 94 and 96. Preferably each of the units 70 is provided with its own control panels 92 to insure a wide selection of services for each zone. Not shown are feeding and watering units which may be of any of the well known types.

EXAMPLE

An example of the function of the hereinbefore described apparatus as applied to raising chickens from newly hatched chicks to mature marketable birds will now be described. In the illustrated housing having the illustrated dimensions, approximately 5,700 newly hatched chicks are placed in the small housing 62. One week later the passage between housing 62 and zone 24 is opened, the lights in zone 62 are extinguished and the lights in 24 are turned on, whereby the chicks move from zone 62 to zone 24. The chicks are maintained in zone 24 for one week and, during this one week period and as soon as the housing 62 has been cleaned of chicken manure, disinfected and the like, a further brood of 5,700 chicks is placed in zone 62. At the end of the second week, the birds from zone 24 are moved into zone 26 by opening the passage 44, extinguishing the lights in zone 24 and turning on the lights in zone 26. At this time, zone 24 is cleaned of manure and the chicks from zone 62 are moved into zone 24. Zone 62 is cleaned and a new batch of 5,700 chicks is placed in zone 62. This procedure of moving birds from the first into the second and then into the third and then into the fourth, fifth, sixth and seventh zone continues until at the beginning of the seventh week the housing 10 plus the auxiliary housing 62 contains approximately 39,900 chickens. At the end of the seventh week, the matured birds in zone 34 are directed from the zone 34 via opening 52 onto the conveyer 48 where they are crated and shipped to the processing plant.

It will thus be seen that, once a cycle has been completed, thereafter, each week approximately 5,700 birds are marketed. Thus, in a seven week period, 39,900 birds are grown from chicks to maturity instead of the 16,000 birds conventionally raised in a chicken house 300 by 40 feet in a substantially more economical and environmentally favorable manner.

It will be particularly appreciated by those skilled in the art that preparing for shipping 5,700 birds per week is highly preferable to preparing for shipment at one time 16,000 birds in an open zone 300 feet long by 40 feet wide.

In the specific example, the chickens are raised from chicks to marketing maturity in seven weeks. Where longer or shorter periods are desired a greater or lesser number of living zones are provided in each housing.

While preferred forms of the present invention have been shown and described, it will be appreciated that various modifications may be made in the basic structures without departing from the scope of the present invention as defined in the claims hereof.

I claim:

1. A structures for raising small animals and particularly the galliformes such as chickens comprising a housing having a plurality of intercommunicable rooms, each of the rooms comprising progressively larger areas and each of said rooms being provided with independently controlled heating, a ventilating, lighting and feeding means, means for progressively moving the small animals sequentially through each such room at a rate such that the animals are at a predetermined maturity upon departure from the last of the rooms a ceiling provided for each of said rooms, means for independently raising and lowering each said ceiling in each said room, and means carried by each of said ceilings for selectively heating and/or cooling, exhausting air from and/or blowing air into each said room and for controlling the lighting in each said room.

2. The invention defined in claim 1 wherein the outer sidewalls of each of the rooms are provided in part with controllable louvers.

* * * * *